July 19, 1966  W. C. CERMAK ETAL  3,261,037
MOLDED BODY SUPPORT
Filed June 3, 1963  2 Sheets-Sheet 1
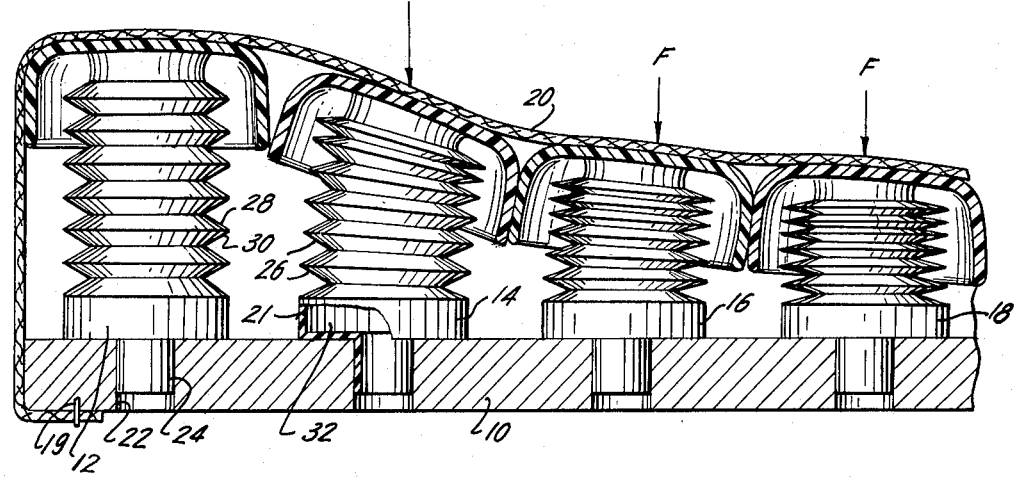
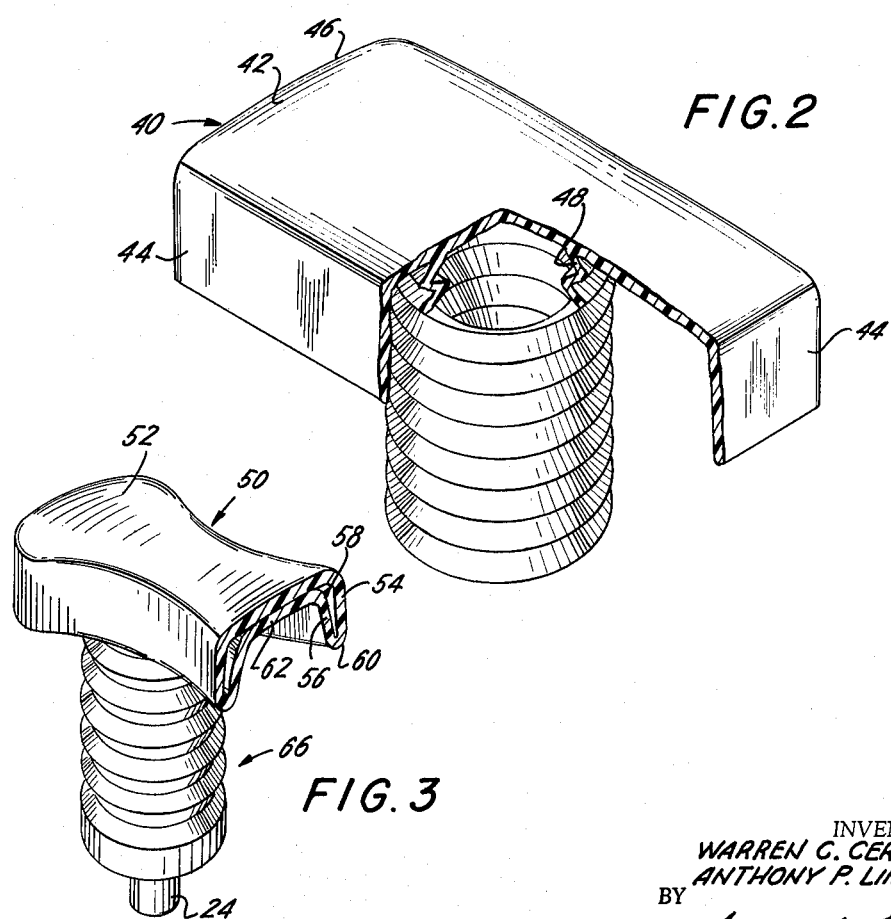
INVENTORS
WARREN C. CERMAK
ANTHONY P. LIMBACH
BY
ATTORNEY July 19, 1966    W. C. CERMAK ETAL    3,261,037
MOLDED BODY SUPPORT
Filed June 3, 1963    2 Sheets-Sheet 2
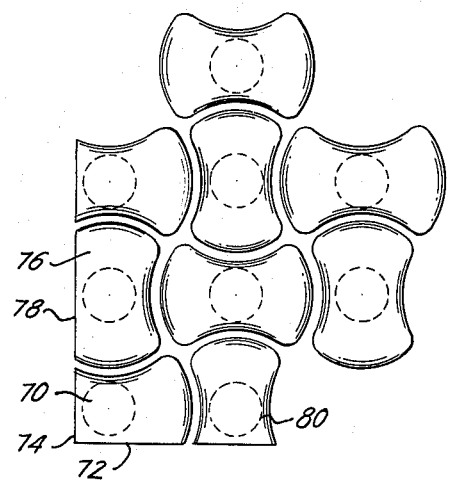
FIG. 4
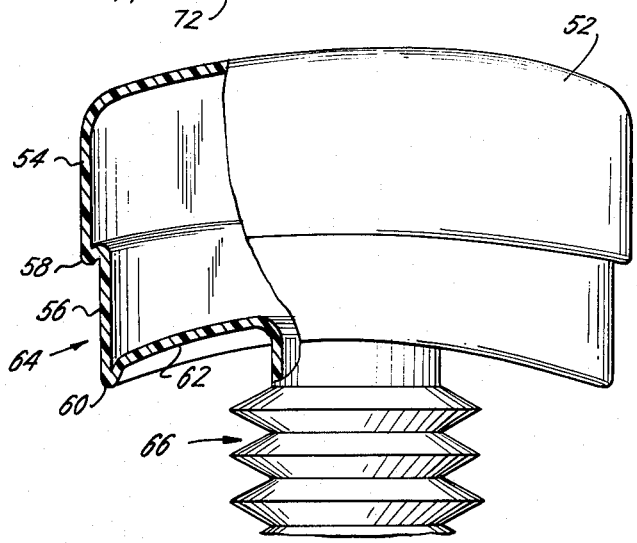
FIG. 5
FIG. 6
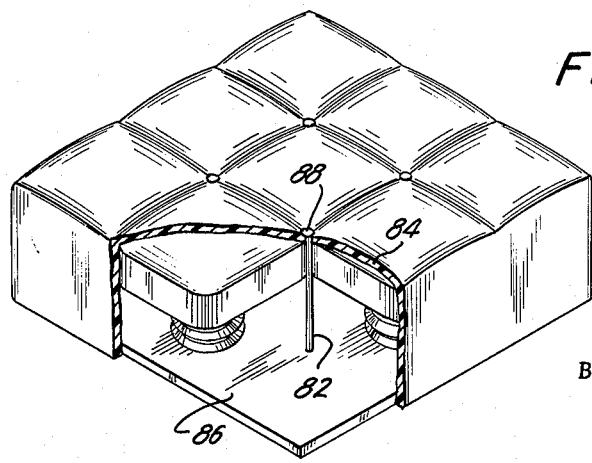
INVENTORS
WARREN C. CERMAK
ANTHONY P. LIMBACH
BY
ATTORNEY

United States Patent Office 3,261,037
Patented July 19, 1966

3,261,037
MOLDED BODY SUPPORT
Warren C. Cermak, Neshanic Station, and Anthony P. Limbach, New Brunswick, N.J., assignors to Union Carbide Corporation, a corporation of New York
Filed June 3, 1963, Ser. No. 285,119
12 Claims. (Cl. 5—351)

This invention relates to a resilient load supporting means, and more particularly to a vented bellows springs and to a bellows spring cushioning assembly, especially for furniture mattresses, automotive and general transportation seating.

The vented bellows assembly disclosed and claimed in U.S. patent application Serial No. 256,376, filed February 5, 1963, and entitled "Molded Body Support" achieves improved design, strength, comfort, stability, and economy over conventional structures which include (1) coil springs (2) foam, (3) sealed pneumatic chambers, and (4) arch springs.

As noted in the above application, coil spring assemblies, although providing stability and variable firmness in selected zones of the article, are expensive, complex in structure, and require extensive hand labor to tie the springs together. Foam material ordinarily has one spring constant, does not breathe properly, and is relatively costly to produce due to the expense of foaming molds and of coring for bottom cavities.

Sealed air chambers are expensive to manufacture and maintain, are not durable, and create the sensation of instability to a person resting on them. This is due to their "balloon" type action and behavior with only slight compressibility. The plastic covered arch-type supports used with modern style seating, are not adaptable to many applications such as, for example, mattresses.

In contrast to these, the vented bellows spring construction simultaneously provides improved stability, simplicity of construction, proper breathing, variable firmness in selected zones of the article, inexpensive construction, durability and other advantages inherent in the assembly.

The foregoing features of vented bellows springs constructions are highly desirable in load supporting cushions. However, the bellows springs are unstable against tilting when the ratio of the spring height to width is high and the bellows spring assemblies exhibit undesirable comfort characteristics when the distance between springs is large, due to the highly localized area of support provided by each spring. Furthermore, the upper edge of compressed bellows has a tendency to "lock" against a bellows of an adjacent uncompressed bellows spring thereby preventing the full expansion of the compressed spring.

It is, therefore, an object of the present invention to provide a bellows spring assembly in which the springs are stabilized against tilting.

It is a further object of the present invention to provide a bellows spring assembly in which there is a vertical sliding action between adjacent springs.

A further object of the invention involves providing a bellows spring which has a broad support area.

According to the present invention a bellows spring is provided having an enlarged head member at one end and a base member at the other end. The head member includes a substantially planar, polygonal section, as for example, a rectangle. Flange means are provided at the periphery of the polygonal section. The flange means can include a plurality of flanges which extend from each side of the polygonal section in the direction of the base member and approximately perpendicularly to the polygonal section.

A further aspect of the invention comprises a resilient load supporting device which is formed from a plurality of the aforementioned springs in combination with a panel member. The springs have their base members mounted on the panel member in a pattern such that the flanges of adjacent springs are in close proximity to each other and advantageously in sliding contact with each other. The lateral force on a single spring is thereby transmitted laterally across the spring assembly thus providing a combined resistance to lateral forces and a stabilization of the surface against tilting.

Other objects and advantages of the invention will be appreciated and the invention will be better understood from the following specification wherein the invention is described by reference to the embodiments illustrated by the accompanying drawings wherein:

FIGURE 1 is a fragmentary side elevational view partly in section of an assembly of springs;

FIGURE 2 is a perspective view partly in section of a bellows spring acording to the present invention;

FIGURE 3 is a perspective view partly in section of a modification of a bellows spring according to the present invention;

FIGURE 4 is a plan view of an assembly of a plurality of the bellows springs of FIGURE 3 with modified bellows springs;

FIGURE 5 is a side elevational view of a modification of the bellows spring of FIGURE 2; and FIGURE 6 is a perspective view partly in section of an assembly of bellows springs.

Basically, the load support device as shown in FIGURE 1 includes a panel member 10 and a plurality of vented resilient plastic bellows 12, 14, 16 and 18. A cover member 20 is provided around the springs and is secured to the panel member, as for example by means of staples 19.

Each of the bellows springs is composed of a series of interconnected individual bellows. As shown in FIGURE 1, each of the bellows 26 is composed of a pair of outwardly converging legs 28 and 30. The series of bellows in combination, form a hollow interior chamber 32. Each of the springs has a base section 21, which can be a rigid cylindrical member. In order to extend the functional length of a spring, the lowest bellows may serve as the base section.

The interior chamber 32 is freely vented to the atmosphere through the hollow elongated neck 24 at the base section of the bellows spring and through opening 22 in the panel member 10. While the actual position of a venting opening or opening is not critical, the venting of the springs must be sufficient to permit air to flow freely, without exerting significant back pressure, during the expansion and compression of the spring. Adequate venting of the spring enables the walls of the bellows to provide support means without the undesired characteristics of sealed air chamber supports.

The principal deflection of each spring, is a result of the flexure of the junctures of the legs of the bellows, with only slight flexing occurring in the legs during spring compression under load. The flexing characteristics of the junctures depend upon the thickness of the junctures, the angle thereof, and the resiliency of the material from which the spring is made.

The springs are preferably made of a resilient polymeric material which will not take on an undue degree of permanent set after repeated compressions of a spring. Permanent set is measured in inches per inches of spring length and is the change in length of a spring, after a number of compressions of the spring, divided by the total possible deflection of the spring.

While polymeric material in general may be employed and polyolefins such as polypropylene, or some other equivalent polymer such as a polymer of ethylene-ethylacrylate mixtures or a butadiene polymer give good results, low density polyethylene exhibits only slight permanent set while providing adequate strength and resiliency and is, therefore, preferred.

Each of the bellows springs, as shown in FIGURE 2, has an enlarged head member 40 at the upper end of the spring. The head member includes a planar, polygonal section 42. The planar section may have a moderate degree of curvature, particularly if the load support assembly is to have a "tufted" appearance.

The polygonal section 42 of the head member 40 as shown in FIGURE 2 is a rectangle. Flange sections 44 extend downwardly from each of the four peripheral sides 46 of the rectangularly shaped section 42, in the general direction of the base section of the spring.

The downwardly depending flanges 44, of the enlarged head member should preferably have a length sufficient so that the uppermost edge of a fully compressed spring will be above the lower edge of the flanges of adjacent uncompressed springs. The maximum necessary length of the flanges would be equal to maximum change in length of a spring under compression. The upper surface of a fully compressed spring such as spring 18, of FIGURE 1, would thus be above the lower edge of the downwardly depending flange of an uncompressed spring, such as spring 12. Thus, a compressed spring cannot contact a bellows edge of an adjoining uncompressed spring but rather is always in contact with the flange portion of an adjoining spring. This serves to preclude the possibility of the upper edge of a compressed spring locking against a bellows of an adjacent spring and assures restoration of the compressed spring to its proper fully uncompressed form.

In many applications the cover member 20 will serve to produce gradual changes in compression between adjacent springs. In such cases, the downwardly depending member need only be at least equal to the maximum difference in compression between springs.

The polygonal section 42 may have any desired number of sides, for example, the enlarged head member may have a rectangular configuration as seen in FIGURE 2 or a "dog bone" type of configuration as seen in FIGURE 3.

The term "polygonal section" as employed herein is intended to include structures which have an infinite number of sides (as in a circle, ellipse or the like), as well as structures which have finite number of sides (as in a rectangle, octagon or the like).

Combinations of polygonal configurations can be advantageously employed, as for example, the outermost surface in a pattern of springs employing "dog bone" shaped enlarged head member, the outermost springs may be modified as shown in FIGURE 4 in order to provide an assembly which has straight sides. The head members 70 of the corner springs have two flat sides 72 and 74, while the remainder of the outermost springs have head members 76 with one straight side 78.

The use of combinations of polygonal configurations provides not only convenient means for producing an assembly with flat sides and squared corners irrespective of the configuration of the head members of interior springs but also provides means for varying the size of the zone in which the individual springs exhibit their supporting action. The bellows 80 can be "off-center" with regard to the head member, in order to further contribute to the wide variations of the firmness characters of the finish assembly which can be readily and inexpensively produced with springs which all have the same degree of rigidity.

The enlarged head member 40 can be preformed in any desired shape. As shown in FIGURE 2, the preformed member is cemented or otherwise centrally secured to the upper leg 48 of the uppermost bellows.

Advantageously, the enlarged head member and bellows can be simultaneously molded as an integral unit in order to assure a structurally strong connection between the enlarged head member and the upper portion of the bellows section. This is particularly desirable when employing polymeric materials such as polyethylene, which resist adhesion by most conventional adhesives.

A blow molding process is advantageously employed for the molding of the bellows springs because of the relatively low cost of the molds, the rapidity and the accuracy of the process. However, if desired, the springs can be centrifugally cast in the manner well known in the art.

Due to the inherent characteristics of the blow molding process, it is necessary when simultaneously blow molding the bellows and the enlarged head to employ a modified bellows spring construction. A problem which arises in the blow molding process is due to the inherent inability of the blow molding process to form flanges which circumscribe the bellows. This is due to the inability of the heated parison to flow around corners to any substantial extent, during the blowing operation.

As shown in FIGURE 5, the blow molded spring has an integral head member 64 and bellows section 66. The head member includes a planar section 52, a first downwardly depending member 54 and a second downwardly depending member 56.

An S shaped section 58 is provided between the two downwardly depending members. A hinging action is thereby provided between the two members 54 and 56 because of the restricted flow of plastic into the outer curved portion of the S and the consequent thinning of the plastic in this area.

A U shaped section 60, is provided between the second downwardly depending member 56 and the section 62. The latter section serves to connect the second member 56 to the bellows section 66. As in the case of the outer curved portion of the S shaped section 58, the limited flow of plastic into the curve of the U produces a thin section and thus provides a hinging action.

The junctions between the two downwardly depending members and between the second member and the horizontal section 62, can have any configuration which results in an area of thinness. Thus, for example, a groove or bellows like section which has its apex displaced outwardly from the downwardly depending members 54 and 56, can be employed.

The blow molding operation produces wall thicknesses which decrease with increasing distance from the central axis of the parison. Therefore, it is possible that the selection of a particular wall thickness for the bellows section can result in undesirably thin downwardly depending members. The parison from which the spring is to be blown will then have to have a varying cross-section in order to compensate for the fact that the downwardly depending members are positioned radially outward of the bellows section. The portion of the parison which is to form the enlarged head will accordingly, have a thicker cross-section than the portion of the parison which is to form the bellows.

While an enlarged head member, having a box-like configuration as seen in FIGURE 5, will serve to enlarge the effective support area of a spring and can function in cooperation with adjacent springs to laterally support a spring, the box-like configuration has the disadvantage of decreasing the bellows or effective spring length in a spring of a particular total length. By folding the upper section (members 52 and 54) of the enlarged head over the lower section (members 56 and 62), not only are the aforementioned disadvantages circumvented but also, the downwardly depending members are in effect combined thus forming a rigidified unit, as shown in FIGURE 3.

As shown in FIGURE 6, tie members 82, can be employed in order to further secure the springs in place and to provide an assembly with a tufted appearance. The tie members are secured at one end to the cover member 84 and at the other end to the support panel 86, by means of enlarged heads or buttons 88 at each end. The tie members are preferably flexible members which fold when the springs are compressed. When the load on the springs is released, the tie members straighten until they reach their maximum length, at which point they limit further axial expansion of the springs.

The use of an enlarged head with peripherally depending flange means on stacked bellows as heretofore described is seen to provide many desirable features such as the lateral support of springs, a free sliding action between springs and readily varied support zones of springs.

Although the invention has been described in its preferred forms with a certain degree of particularity, it is understood that the present disclosure of the preferred forms has been made only by way of example and that numerous changes in the details of construction and the combination and arrangements of parts may be resorted to without departing from the spirit and the scope of the invention as hereinafter claimed.

What is claimed is:

1. In a resilient load supporting device having a panel member and a plurality of resilient, vented hollow, columnar bellows springs mounted on said panel member, the improvement comprising, each of said springs having an enlarged head member at a first end and a base member at said second end, said head member having a substantially planar, polygonal, section and a flange section extending from the periphery of said polygonal section, approximately perpendicularly to said polygonal section and each flange section being in a sliding relationship with a flange section of an adjacent spring said springs having their base members mounted on said panel member.

2. The device of claim 1, wherein said flange section extends approximately perpendicularly from said polygonal section in the direction of said base member.

3. The device of claim 1, wherein said polygonal section is rectangular and a flange section extends approximately perpendicularly from each side of the rectangle, in the direction of said base member.

4. A resilient load supporting device comprising a support panel and a plurality of resilient, molded, plastic bellows springs, each of said springs having a base member, a head member and a series of integrally interconnected individual bellows therebetween defining an inner chamber vented to the outside to allow free movement of air between the exterior and interior thereof; the walls of each bellow spring forming a series of compressible, resilient, plastic support hinges biased to an expanded condition, said hinges being arranged at the periphery of said bellows and having memory and resilience to return to the expanded condition upon removal of a load causing variable compression, said hinges being the sole support for loads applied to the device, pneumatically unhindered in their action, said head member having a substantially planar, polygonal section and flange means extending from the periphery of said polygonal section in the direction of said base member in a plane perpendicular to the plane of said polygonal section, the plane of said flange means lying radially outwardly of the periphery of at least a plurality of the uppermost bellows and each flange means being in a sliding relationship with a flange means of an adjacent spring.

5. A resilient load supporting device comprising, a support means and a plurality of hollow resilient plastic bellows springs engaged at their base ends in said support means, said springs having vent means between the interior and exterior thereof and an enlarged head member, said head member having a substantially planar, polygonal section and a plurality of downwardly extending flange sections at peripheral sides of said polygonal section and each flange section being in a sliding relationship with a flange section of an adjacent spring, said springs being mounted on said panel.

6. The device of claim 5, wherein each of a plurality of said springs has a plurality of flange sections in slidable contact with flange sections of adjacent springs.

7. In a resilient load supporting device having a panel member and a plurality of resilient, vented hollow, columnar bellows springs mounted on said panel member, the improvement comprising, each of said springs having an enlarged head member at one end, said head member having a substantially planar section and a peripheral flange means extending from the periphery of said planar section and each flange section being in a sliding relationship with a flange section of an adjacent spring, said springs being mounted on said panel member.

8. In a resilient load supporting device having a panel member and a plurality of resilient, vented hollow, columnar bellows springs mounted on said panel member, the improvement comprising, each of said springs having an enlarged head member at a first end and a base member at a second end, said head member having a substantially planar, section and at least one peripherally depending abutment member extending approximately perpendicularly from the periphery of said planar section, in the direction of said base member and each abutment members being in a sliding relationship with an abutment member of an adjacent spring, said springs having their base members mounted on said panel member.

9. A resilient, hollow, vented bellows spring comprising a base section, a head section and a series of integrally interconnected individual bellows therebetween defining an inner chamber vented to the outside to allow free movement of air between the exterior and interior thereof; the walls of each bellows spring forming a series of compressible, resilient, plastic support hinges biased to an expanded condition, said hinges being arranged at the periphery of said bellows and having memory and resilience to return to the expanded condition upon removal of a load causing variable compression, said hinges being the sole support for loads applied to the device, pneumatically unhindered in their action, said head member having a substantially planar, polygonal section and flange means extending from the periphery of said polygonal section, in the direction of said base member in a plane perpendicular to the plane of said polygonal section, the plane of said flange means lying radially outwardly of the periphery of at least a plurality of the uppermost bellows.

10. A resilient, hollow, vented bellows spring comprising a base section, a head section and a series of integrally interconnected individual bellows therebetween and integral therewith, defining an inner chamber vented to the outside to allow free movement of air between the exterior and interior thereof, the walls of each bellows spring forming a series of compressible, resilient, plastic support hinges biased to an expanded condition, said hinges being arranged at the periphery of said bellows and having memory and resilience to return to the expanded condition upon removal of a load causing variable compression, said hinges being the sole support for loads applied to the device, pneumatically unhindered in their action, said head member having a substantially planar, polygonal section and a U shaped flange section, a first leg of said flange section being integrally connected to said polygonal section, and a second leg being integrally connected to the outer periphery of an annular member, the inner periphery of said annular member being integrally connected to the uppermost bellows of said series of bellows.

11. The device of claim 10, wherein said U shaped flange section extends from the periphery of said polygonal section in the direction of said base member in a plane perpendicular to the plane of said polygonal section, the plane of said flange section lying radially outwardly of the periphery of at least a plurality of the uppermost bellows.

12. A resilient, hollow, vented bellows spring comprising a base section, a head section and a series of integrally interconnected individual bellows therebetween defining an inner chamber vented to the outside to allow free movement of air between the exterior and interior thereof; the walls of each bellows spring forming a series of compressible, resilient, plastic support hinges biased to an expanded condition said hinges being arranged at the periphery of said bellows and having memory and resilience to return to the expanded condition upon removal of a load causing variable compression, said hinges being the sole support for loads applied to the device, pneumatically unhindered in their action, said head member having a substantially planar, polygonal section and a flange means extending from the periphery of said polygonal section in the direction of said base member, in a plane perpendicular to the plane of said polygonal section, said flange means having a first section, a second section and a flexible hinge section therebetween, a connecting member, said connecting member having one end connected to the uppermost bellows and the other end hingedly connected to the second section of said flange means, said first section of said flange means being rigidly connected to said planar section, the plane of each flange section lying radially outwardly of the periphery of at least a plurality of the uppermost bellows.

References Cited by the Examiner

UNITED STATES PATENTS

| | | | |
|---|---|---|---|
| 168,845 | 10/1875 | Pratt | 267—63 |
| 2,350,711 | 6/1944 | Amos | 267—1 |
| 3,031,690 | 5/1962 | Ramsay | 5—353 |

OTHER REFERENCES

German printed application, Schneider, 1,148,718, May 1963.

FRANK B. SHERRY, *Primary Examiner.*

A. M. CALVERT, *Assistant Examiner.*